United States Patent [19]

Gollmar et al.

[11] Patent Number: 4,901,354

[45] Date of Patent: Feb. 13, 1990

[54] METHOD FOR IMPROVING THE RELIABILITY OF VOICE CONTROLS OF FUNCTION ELEMENTS AND DEVICE FOR CARRYING OUT THIS METHOD

[75] Inventors: Klaus Gollmar, Horb-Ahldorf; Gerhard Jünemann, Leonberg, both of Fed. Rep. of Germany

[73] Assignee: Daimler-Benz AG, Stuttgart, Fed. Rep. of Germany

[21] Appl. No.: 279,814

[22] Filed: Dec. 5, 1988

[30] Foreign Application Priority Data

Dec. 18, 1987 [DE] Fed. Rep. of Germany ....... 3742929

[51] Int. Cl.4 .............................................. H03G 3/20
[52] U.S. Cl. ................................................... 381/110
[58] Field of Search .................. 381/97, 110, 71, 169, 381/94, 46

[56] References Cited

U.S. PATENT DOCUMENTS

| | | |
|---|---|---|
| 3,383,466 | 5/1968 | Hillix et al. |
| 4,357,488 | 11/1982 | Knighton et al. ................... 381/110 |
| 4,581,758 | 4/1986 | Coker et al. ......................... 381/92 |
| 4,625,083 | 11/1986 | Poikela ................................. 381/71 |
| 4,718,096 | 1/1988 | Meisel ................................. 381/169 |

FOREIGN PATENT DOCUMENTS

| | | |
|---|---|---|
| 3401883 | 7/1985 | Fed. Rep. of Germany . |
| 3610797 | 10/1986 | Fed. Rep. of Germany . |
| 2003002 | 2/1979 | United Kingdom . |

Primary Examiner—Forester W. Isen
Attorney, Agent, or Firm—Barnes & Thornburg

[57] ABSTRACT

In a method and a device for reliably detecting at least the beginning of a voice command for a voice control of function elements, signals of a first microphone to which contact sound of an operating person is applied, are used for triggering a second microphone which is directed towards the mouth of the operating person in order to improve the reliability of the voice control in high ambient noise.

12 Claims, 2 Drawing Sheets

METHOD FOR IMPROVING THE RELIABILITY OF VOICE CONTROLS OF FUNCTION ELEMENTS AND DEVICE FOR CARRYING OUT THIS METHOD

BACKGROUND AND SUMMARY OF THE INVENTION

The invention relates to recognizing voice in a noisy environment and more specifically to elements controlled by voice initiations.

A generic method can be derived from the operation of a device known from DE-OS 36 10 797 or U.S. Pat. No. 4,625,083. This already contains a voice microphone and an ambient noise microphone the signals of which are brought into relation to one another by electric subtraction. During the subtraction, the noise components applied equally to the two microphones—particularly ambient noises—are eliminated so that the resulting residual signals can be easily comprehended as voice commands. The beginning of the voice signal remaining after the subtraction is intended to produce, for example, a change-over of a hand-free telephone from receiving to transmitting mode only if really required.

To keep the proportion of voice sound applied to the ambient noise microphone when the operating person is speaking as low as possible, the ambient noise microphone must be arranged at some distance from the mouth of the operating person. The result of this is, however, that the ambient noise level at the ambient noise microphone does not necessarily correspond to that at the voice microphone so that even without voice being applied to the voice microphone, the result of the subtraction of the signals of the two microphones always switched to readiness to transmit must not always be equal to zero. This is why control errors cannot be excluded even here.

Furthermore, other devices with comparable function are known which only switch a single voice microphone each to readiness to transmit under particular conditions.

This is done in generally known manner by a transmit key being manually operated by the microphone user.

From GB-A 2003 002, a device is know which automatically closes a transmitter switch when the microphone input level suddenly rises.

In DE-OS 34 01 883, the proposal is disclosed to switch a microphone to readiness to transmit by a proximity sensor which detects the approach of the head of the operating Person to the microphone for speaking.

In all these devices, only one (voice) microphone is always used.

In U.S. Pat. No. 3,383,466 non-acoustic parameters are measured and used in a speech recognition system. Larynx vibration and nasal sounds are measured by microphones, lips are read optically and air velocity is measured by an anemometer.

The present invention has the object of specifying a method by which an interpretation of pure ambient noises as the beginning of a voice command can be eliminated by using a sound which is predominantly generated during speaking and a microphone to which at least ambient noises are applied, and of suitably constructing the generic device for carrying out the method according to the invention.

According to the invention, this object is achieved by the following.

Since contact sound generated during speaking can be picked up with extremely short time delay at the head or neck, particularly at the throat of the operating person, a signal generated by a direct-contact microphone is very suitable for detecting the beginning of a voice command. The actual voice microphone, to which ambient noises are also applied, can be electrically switched on by the contact sound signal for voice signal transmission exactly at the time of the beginning of the voice command without possibility of error. During this process, the operating person does not need to make any deliberate hand or head movement because both microphones can be carried in suitable harnesses in accordance with a development of the device. Neither is the operator impeded in any sequences of movements, especially not if furthermore a portable transmitter is also provided which transmits the voice commands by wireless means to an appropriate receiver.

Although the electric signals of the direct-contact microphone alone are not sufficient for voice recognition since they cannot reproduce, for example, any formants and nasal sounds, they can further enhance the transmitted voice pattern of the voice microphone if they are suitable combined with the electric signals of the voice microphone, for example by phase-synchronous addition.

It is furthermore advantageous that the voice microphone is automatically switched off whenever speech pauses arise. The switch-on duration can also be automatically restricted to the permissible word reception duration of the voice recognition circuit. In the switch-on case, a signal is supplied to the operating person.

Other objects, advantages and novel features of the present invention will become apparent from the following detailed description of the invention when considered in conjunction with the accompanying drawings.

DETAILED DESCRIPTION OF THE DRAWINGS

Figure 1:
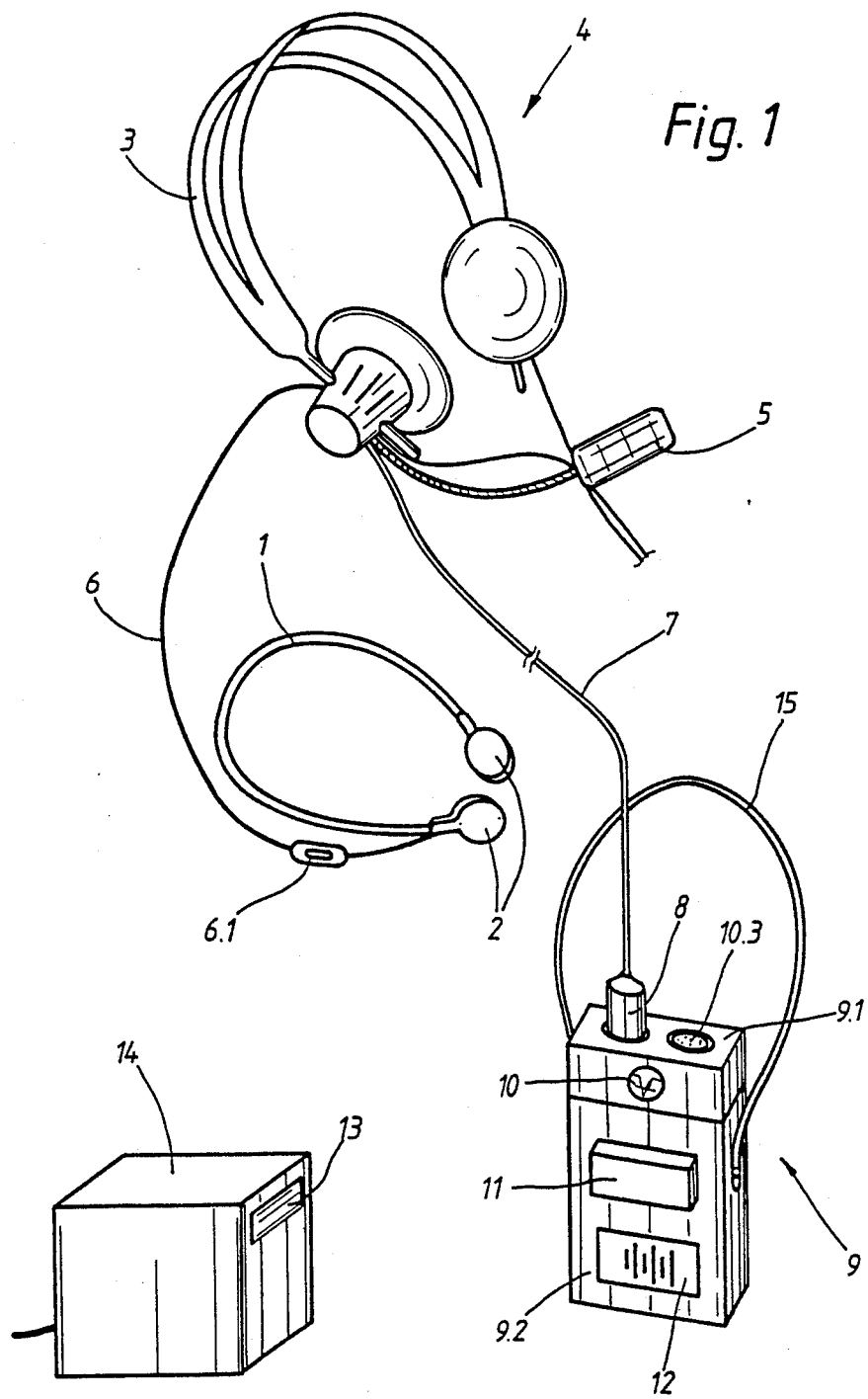
FIG. 1 shows a diagrammatic representation of the device.

A first microphone 2—constructed as double-throat microphone—which is to be applied to the neck of an operating person, not shown, is attached to a neck harness 1. A second microphone 5 to be directed towards the mouth of the operating person is attached to a head harness 3 which belongs to headset 4. From the first microphone 2, a signal line 6, including an interrupting switch 6.1 to be manually operated, leads from the first microphone 2 to the head harness 3 and from there is introduced, together with a signal line of the second microphone 5, in a flexible cable 7 via a multi-pin plug-in connection 8 into a first housing part 9.1 of a housing 9.

Figure 2:
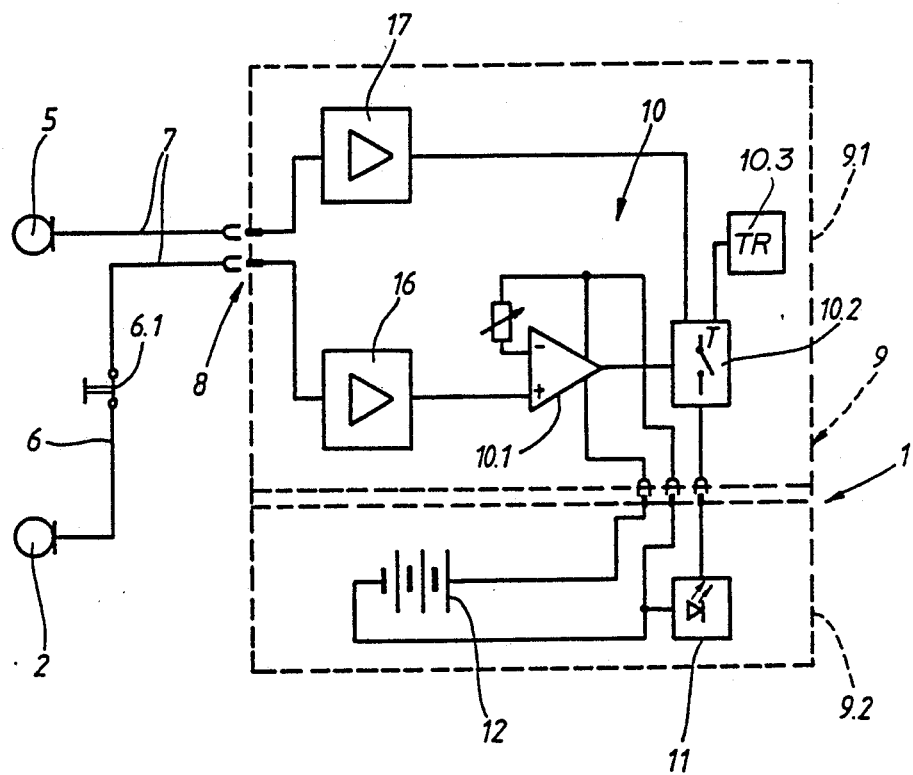
FIG. 2 shows in a block diagram how the microphones and the trigger circuit according to the invention are connected together.

In the first housing part 9.1, a trigger circuit 10, shown diagrammatically by a transistor symbol and explained in detail in FIG. 2, is supplied with the electric signals of the two microphones 2 and 5. Finally, a signal transmitter 10.3 is also indicated which can be activated by a timing section provided in the trigger circuit 10 and provides the operating person with a visual or audible signal when the maximum word reception duration of a voice recognition circuit 14 is exceeded.

In a second housing part 9.2 of the housing 9, a transmitter 11 and an an electric energy source or battery 12 are arranged. The transmitter 11 corresponds to a receiver 13 of the voice recognition circuit 14. A carrying handle or belt 15 can be advantageously attached to the second housing part 9.2.

In the generally simplified block diagram of FIG. 2, the circuit symbols corresponding to the previously mentioned circuit elements of the device are provided with the same reference numbers.

The trigger circuit 10 essentially consists of a threshold switch 10.1 with a reference value which can be adjusted, for example, at a potentiometer, and of a normally-open switch 10.2 which is controllable by the threshold switch 10.1. The switch 10.2 is in series with he signal path of the second microphone 5. The normally-open switch 10.2 advantageously contains a timing section T which opens the switch 10.2 after the maximum word reception duration of the voice recognition circuit 14 has elapsed and activates the signal transmitter 10.3 for the purpose mentioned.

The transmitter 11 can operate in accordance with any principles of wireless signal transmission. An infrared diode is drawn in as an example.

Furthermore, an amplifier 16 for the signals of the first microphone 2 and an amplifier 17 for the signals of the second microphone 5 are also arranged in the first housing part 9.1.

Once contact sound is applied to the first microphone 2 and after the threshold switch 10.1 has responded, the switch 10.2 is closed and conducts the amplified and filtered signals of the second microphone 5.

If the operating person should have to clear his throat or cough, he can prevent unwanted signal transmission by the interrupting switch ("throat-clearing key") 6.1.

Finally, an audible signal which marks that the maximum word reception duration has been exceeded, can also be advantageously supplied to the operating person via the headset 4 instead of via the direct-radiating signal transmitter 10.3.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. Method for improving the reliability of voice control systems of function elements at work stations or in motor vehicles, particularly by reliably detecting the beginning of voice commands in a voice recognition circuit, in which mainly sound generated during speaking is applied to a first microphone and at least ambient noises are applied; to a second microphone and in which misinterpretation of a pure ambient noise as voice command is prevented by signals generated in both microphones being electrically brought into a particular relation with respect to one another, wherein contact measurable sound generated during the speaking of an operating person is applied to the first microphone by direct contact and that the second microphone, which is directed towards the mouth of the operating person with a spatial distance and to which, as a result, sound generated during speaking is also applied, is electrically switched to the voice recognition circuit for the transmission of the voice signal only when the first microphone in turn generates signals from the contact measurable sound.

2. A voice control system including a first microphone to which mainly sound waves generated during speaking can be applied, a second microphone to which at least ambient noises can be applied, and an electric circuit which produces a particular relation between electric signals generated by the two microphones and supplies output signals to a voice recognition circuit, wherein the first microphone is constructed as a direct-contact microphone resting against a part of the body of an operating person; the second microphone is directed towards the mouth of the operating person at a spatial distance and is furthermore supplied with sound generated during speaking; and the electric circuit is constructed as a trigger circuit, which can be actuated by signals generated by the first microphone, for Producing a switching relation between signals of the first and the second microphone, which switching relation enables signals of at least the second microphone to be supplied as output signals to the voice recognition circuit only if signals of the first microphone are present at the same time as the signal of the second microphone at the trigger circuit.

3. Device according to claim 2, wherein the first microphone is a throat microphone which can be applied to the neck of the operating person.

4. Device according to claim 3, wherein both microphones are attached to harnesses which can be worn by the operating person.

5. Device according to claim 2, including a timing means with a time constant which is adjustable to the maximum word reception duration of the voice recognition circuit for interrupting the supply of output signals of the trigger circuit to the voice recognition circuit after the time constant set has elapsed.

6. Device according to claim 2, including means for electrically combining the signals of the first and second microphones for optimizing the recognizability of the signals of the second microphone.

7. Device according to claim 2, wherein the trigger circuit includes a threshold switch which compares the electric signals of the first microphone with an adjustable threshold value and a second switch, which can be closed by the threshold switch if the signals of the first microphone are above the threshold value, in series with the path of the electric signals of the second microphone.

8. Device according to claim 7, including a timing means integrated in the second switch, said timing means having a time constant which is adjustable to the maximum word reception duration of the voice recognition circuit for interrupting the supply of output signals of the trigger circuit to the voice recognition circuit after the time constant set has elapsed.

9. A voice control system including a first microphone to which mainly sound waves generated during speaking can be applied, a second microphone to which at least ambient noises can be applied, and an electric circuit which produces a particular relation between electric signals generated by the two microphones and supplies output signals to a voice recognition circuit, wherein:

the first microphone is constructed as a direct-contact microphone resting against a part of the body of an operating person;

the second microphone is directed towards the mouth of the operating person at a spatial distance and is furthermore supplied with sound generated during speaking;

the electric circuit is constructed as a trigger circuit, which can be actuated by signals generated by the first microphone, for producing a switching relation between signals of the first and the second microphone, which switching relation enables signals of at least the second microphone to be supplied as output signals to the voice recognition circuit only if signals of the first microphone are present at the same time as the signal of the second microphone at the trigger circuit; and a housing, to be carried by the operating person, accommodating the trigger circuit which is electrically connected to both microphones, a transmitter for the wireless transmission of outputs signals of the trigger circuit to a receiver of the voice recognition circuit, and an electric energy source for energizing at least the trigger circuit and the transmitter.

10. Device according to claim 9, wherein the housing includes a first housing part for accommodating the trigger circuit and a second housing part for accommodating the transmitter and the energy source; and wherein the trigger circuit is electrically connected to the transmitter and the energy source by a multi-pin plug-in connection arranged between and coupling the two housing parts.

11. A voice control system including a first microphone to which mainly sound waves generated during speaking can be applied, a second microphone to which at least ambient noises can be applied, and an electric circuit which produces a particular relation between electric signals generated by the two microphones and supplies output signals to a voice recognition circuit, wherein:

the first microphone is constructed as a direct-contact microphone resting against a part of the body of an operating person;

the second microphone is directed towards the mouth of the operating person at a spatial distance and is furthermore supplied with sound generated during speaking;

the electric circuit is constructed as a trigger circuit, which can be actuated by signals generated by the first microphone, for producing a switching relation between signals of the first and the second microphone, which switching relation enables signals of at least the second microphone to be supplied as output signals to the voice recognition circuit only if signals of the first microphone are present at the same time as the signal of the second microphone at the trigger circuit;

a timing means, with a time constant which is adjustable to the maximum word reception duration of the voice recognition circuit, for interrupting the supply of output signals of the trigger circuit to the voice recognition circuit after the time constant set has elapsed; and a signal transmitter which is activated for generating a signal to the operating person after the time constant has elapsed.

12. A voice control system including a first microphone to which mainly sound waves generated during speaking can be applied, a second microphone to which at least ambient noises can be applied, and an electric circuit which produces a particular relation between electric signals generated by the two microphones and supplies output signals to a voice recognition circuit, wherein:

the first microphone is constructed as a direct-contact microphone resting against a part of the body of an operating person;

the second microphone is directed towards the mouth of the operating person at a spatial distance and is furthermore supplied with sound generated during speaking;

the electric circuit is constructed as a trigger circuit, which can be actuated by signals generated by the first microphone, for producing a switching relation between signals of the first and the second microphone, which switching relation enables signals of at least the second microphone to be supplied as output signals to the voice recognition circuit only if signals of the first microphone are present at the same time as the signal of the second microphone at the trigger circuit; and an interrupting switch, to be manually operated, is in series between the first microphone and the trigger circuit.

* * * * *